United States Patent [19]

Cypher et al.

[11] Patent Number: 5,444,701
[45] Date of Patent: Aug. 22, 1995

[54] METHOD OF PACKET ROUTING IN TORUS NETWORKS WITH TWO BUFFERS PER EDGE

[75] Inventors: Robert E. Cypher, Los Gatos; Luis Gravano, Mountain View, both of Calif.

[73] Assignee: International Business Machines Corporation, Armonk, N.Y.

[21] Appl. No.: 969,650

[22] Filed: Oct. 29, 1992

[51] Int. Cl.$^6$ ............................................. H04L 12/42
[52] U.S. Cl. ................................... 370/60; 390/85.12; 390/94.3
[58] Field of Search ..................... 370/13, 13.1, 17, 54, 370/60, 60.1, 61, 79, 85.9, 85.12, 85.15, 94.1, 94.2, 94.3

[56] References Cited

U.S. PATENT DOCUMENTS

| | | | |
|---|---|---|---|
| 4,742,511 | 5/1988 | Johnson | 370/94 |
| 4,805,091 | 2/1989 | Thiel et al. | 364/200 |
| 4,814,980 | 3/1989 | Peterson et al. | 364/200 |
| 4,933,933 | 6/1990 | Dally et al. | 370/60 |
| 4,984,235 | 1/1991 | Hillis et al. | 370/60 |
| 5,008,815 | 4/1991 | Hillis | 364/200 |
| 5,105,424 | 4/1992 | Flaig et al. | 370/94.1 |
| 5,151,900 | 9/1992 | Snyder et al. | 370/94.3 |
| 5,157,692 | 10/1992 | Horie et al. | 370/60 X |

FOREIGN PATENT DOCUMENTS

460599 12/1991 European Pat. Off. .
2227341 7/1990 United Kingdom .

OTHER PUBLICATIONS

Y. Tamir and G. L. Frazier, "Dynamically—Allocated Multi-Queue Buffers for VLSI Communication Switches", IEEE Transactions on Computers, vol. 41, No. 6, pp. 725–737, Jun. 1992.

R. Cypher and L. Gravano, "Adaptive, Deadlock-Free Packet Routing in Torus Networks with Minimal Storage", IBM RJ 8571 (77350), Jan. 15, 1992.

Dally, William J., "Deadlock-Free Message Routing in Multiprocessor Interconnection Networks", IEEE Transactions on Computers, vol. C-36, No. 5, May 1987.

Dally, William J., "The torus routing chip", Distributed Computing (1986) 1:187–196.

Hayes, John P., "Computer Architecture and Organization", Second Edition (1988), pp. 645–664.

Hwang, Kai, "Computer Architecture and Parallel Processing", (1984), Chapter Five, pp. 325–392.

Konstantinidou, S., "Chaos Router: A Practical Application of Randomization in Network Routing", 2nd Annual ACM Symposium on Parallel Algorithms and Architectures, Jul. 2–6, 1990, Island of Crete, Greece.

Tamir, Yuval, "Dynamically—Allocated Multi-Queue Buffers for VLSI Communication Switches", IEEE Transactions of Computers, vol. 41, No. 6 Jun. 1992.

Tanenbaum, Andrew S., "Computer Networks", Second Edition (1988), Chapter 1, pp. 6–21.

Van De Goor, A. J., "Computer Architecture and Design", (1989), Chapter 16, pp. 473–506.

Primary Examiner—Melvin Marcelo
Attorney, Agent, or Firm—Philip E. Blair; James C. Pintner

[57] ABSTRACT

A method is for routing packets in parallel computers with torus interconnection networks of arbitrary size and dimension having a plurality of nodes, each of which contains at least 2 buffers per edge incident to the node. For each packet which is being routed or which is being injected into the communication network, a waiting set is specified which consists of those buffers to which the packet can be transferred. The packet can be transferred to any buffer in its waiting set which has enough storage available to hold the packet. This waiting set is specified by first defining a set of nodes to which the packet is allowed to move and then defining a candidate set of buffers within the defined set of nodes. Then, defining an ordering of the nodes across the network from smallest to largest. The buffers in each node are then classified into four classes. After the buffers in each node have been classified, a set of rules for placing into the waiting set those classes of candidate buffers to which the packet can move is provided such that the routing method is free of deadlock, livelock, and starvation.

32 Claims, 2 Drawing Sheets

METHOD OF PACKET ROUTING IN TORUS NETWORKS WITH TWO BUFFERS PER EDGE

FIELD OF THE INVENTION

Broadly conceived, the present invention relates to packet routing on parallel computers with torus interconnection networks of arbitrary size and dimension and, in particular, to methods for defining sets of buffers to which packets are allowed to move.

BACKGROUND HISTORY

A typical computer has a central processing unit (CPU) which controls the processing of the computer. A computer system may contain more than one processor or node. Such a computer system would be able to process much more data in a faster timeframe in a parallel fashion than would a computer system having a single processor.

A computer having multiple processors configured in a grid with all the processors working simultaneously in parallel is known as a mesh configuration. In a mesh configuration, the processors are connected to their neighboring processors in a mesh. Each node or processor would have 4 edges, or fewer if the processor is on a boundary of the mesh, with each edge connected to the next neighbor processor. If the edges of the mesh were wrapped around such that the processors on the boundary of the mesh were connected to the processors on the opposite boundary of the mesh, a toroidal configuration would result. This is known as a torus network.

Parallel computers with mesh and torus interconnection networks are known in the art because they are able to support many scientific and image processing applications very efficiently and have advantages in terms of ease of construction. A d-dimensional mesh or torus can be implemented with short wires in d-dimensions. In addition, mesh and torus networks can be constructed using identical boards each of which requires only a small number of pins for connections to other boards containing processor units. Because of this modularity a large number of distributed memory parallel computers utilize a mesh or torus interconnection network.

In terms of the differences between torus and mesh configured networks, for given d-dimensional mesh and torus computers of equal size, the torus computer has approximately half the diameter and twice the bisection bandwidth of the mesh computer. Furthermore, torus networks are node symmetric, i.e., all nodes in the torus are identical and therefore no region of the torus is particularly likely to suffer from congestion, which is the condition when the interconnection network becomes clogged with messages and begins to slow itself down. In contrast, mesh networks are not node symmetric and their lack of symmetry can cause certain regions of the mesh to suffer congestion. As a result, torus interconnection networks are expected to play an increasingly important role in future generations of parallel computers.

The processors in a parallel computer communicate with one another by sending or routing packets of data across the network to the other processors. These packets are sent through the interconnection network from their source processors (nodes) to their destination nodes by a packet routing algorithm. A fundamental requirement of any packet routing algorithm is that it must at the very least guarantee that all messages will eventually be delivered to their destinations. In order for the packet routing algorithm to satisfy this basic requirement, it must keep the interconnection network free from conditions known as deadlock, livelock, and starvation.

Deadlock is the condition of the interconnection network in which a set of buffers is completely occupied by messages all of which are only allowed to move to other buffers within the set. As a result, none of the messages in this set of buffers can make progress and none of them will ever be delivered. Livelock is the condition of the interconnection network in which a packet moves between buffers an unbounded number of times without being delivered to its destination processor. Thus, a routing algorithm which is subject to livelock may never deliver a packet to its destination processor even though the packet continues to move throughout the network amongst various nodes. Starvation is the condition of the interconnection network in which a packet waits for a buffer which becomes available an unbounded number of times without ever being granted access to that buffer. Thus a routing algorithm which is subject to starvation may fail to move a packet at all even though a buffer is available into which that packet could be moved.

A packet routing algorithm should also exhibit good performance characteristics. In order to provide good performance, a routing algorithm should avoid sending packets along unnecessarily long routes. A routing algorithm is said to be minimal if the routing algorithm sends each packet along the shortest possible route.

A packet routing algorithm should also be able to adapt to network congestion conditions. A packet routing algorithm is said to be adaptive if it allows packets to adapt to the various traffic conditions in the interconnection network and to select an alternative path based on the congestion any given packet encounters enroute. By allowing packets to take alternate routes which avoid congestion, adaptive routing algorithms can greatly improve network communication performance. An adaptive, minimal routing algorithm that allows every packet to take all of its shortest routes to its destination node is said to be fully adaptive.

Packet routing algorithms can be further classified by the type of switching mode or routing that they utilize. In store-and-forward routing, each packet is stored completely in a node before being sent to the next node along the path. In general, store-and-forward routing is a simple technique which works well when the packets are small in comparison with the channel widths. In contrast, wormhole routing breaks each packet into small pieces called flits. As soon as a flit has been received by a node, the flit is sent to the next node in its path without waiting for the remaining flits of the packet to arrive. This creates a worm of flits which follow one another from node to node through the network towards their destination node. If the head of this worm of flits encounters congestion the entire worm is prevented from making process. Another switching mode which is similar to wormhole routing, is known as virtual cut-through routing. In virtual cut-through routing, each packet is sent as a worm of flits which follow one another through the network with each node buffering the entire worm inside the node whenever congestion occurs on the interconnection network in order to reduce traffic. This requires the use of internal buffers in each node which are set aside for buffering packets that have encountered congestion.

Assuming relatively little message traffic across the interconnection network, wormhole routing and virtual cut-through routing perform well with long messages. However, under heavy traffic conditions virtual cut-through routing performs significantly better than wormhole routing due to the fact that each entire blocked message is stored: internally within one node thereby removing the message from traffic.

One disadvantage of virtual cut-through routing is that it requires significantly more internal node storage than does wormhole routing. Large storage requirements arc undesirable for two reasons. First, providing a large amount of internal storage is expensive in terms of space and overhead. Second, even if sufficient storage is available in the routing hardware, routing algorithms which require large amounts of internal storage in order to avoid deadlock place restrictions on how that storage can be used thus leading to ineffective use of the limited available storage resulting in poor network routing performance.

Many techniques have been developed to reduce the storage requirements of deadlock-free store-and-forward and virtual cut-through routing algorithms. These techniques can be divided into two classes, i.e., those which require only central buffers for storage and those which require that each node have internal buffers that are associated with each edge that is incident to the node. Routing algorithms in the first class require that all packets entering a node are stored in a central buffer. If a large number of packets enter the node simultaneously, some of the packets will be forced to wait while the remaining packets are placed in the central buffers because it may be impractical to design n-ported buffers for large values of n. As a result, the central buffers can become sequential bottlenecks which degrade network communication performance. In contrast, routing algorithms in the second class allow packets which enter a node simultaneously to be routed through the node in parallel because they do not require a single, central resource. Thus, algorithms i,n the second class, i.e., namely those that do not require central buffers, offer the potential for better network performance.

SUMMARY AND OBJECTS OF THE INVENTION

The present invention relates to methods for packet routing on parallel computers with torus interconnection networks of arbitrary size and dimension.

Therefore, it is a primary object of the present invention to provide a message packet routing algorithm for torus interconnection networks which is free from deadlock, livelock and starvation.

It is another primary object of the present invention to provide a packet routing algorithm which uses only minimal length paths to route every message packet to its destination node.

It is yet another primary object of the present invention to provide a routing algorithm that is fully adaptive so that every packet is allowed to be routed along every minimal length path from its source node to its destination node.

It is yet another object to provide a routing algorithm that can be implemented on nodes having a small number of buffers per node and yet does not require central buffers in any of the nodes.

Briefly and to achieve the foregoing objects in accordance with the present invention as embodied and broadly described herein, a method for routing packets in parallel computers with torus interconnection networks of arbitrary size and dimension having a plurality of nodes, each of which contains at least 2 buffers per edge incident to the node is disclosed. For each packet which is being routed or which is being injected into the communication network, the present method specifies a waiting set which consists of those buffers to which the packet can be transferred. The packet can be transferred to any buffer in its waiting set which has enough storage available to hold the packet.

The present method for specifying this waiting set has the steps of first a set of nodes to which the packet is allowed to move and defining a candidate set of buffers within the defined set, of nodes. Then, defining an ordering of the nodes is defined across the network from smallest to largest. Next, the method classifies the buffers in each node into four classes designated as A, B, C and D for referential purposes. The classifying of the buffers comprises the steps of first, associating buffers of classes A and C with each edge which connects to a node that is larger in the defined ordering than the node containing the A and C classes of buffers and, second, associating buffers of classes B and D with each edge which connects to a node that is smaller in the defined ordering than the node containing the B and D classes of buffers. After the buffers in each node have been classified, the method involves a set of rules for placing into the waiting set those classes of candidate buffers to which the packet can move.

It is an advantage of the present invention to provide a routing algorithm which decreases congestion in the network.

It is another advantage to provide a routing algorithm which can be implemented efficiently with minimal cost and high network performance.

It is yet another advantage to provide a routing algorithm that can operate in either store-and-forward or Virtual cut-through switching modes.

It is yet another advantage to provide a routing algorithm that does not require the existence of a global clock.

Additional objects and advantages of the present invention will be set forth in the description which follows, and in part will be obvious from the description or may be learned by the practice of this invention. The objects and advantages of this invention as described herein may be realized and obtained by what is particularly pointed out and distinctly claimed in the appended claims taken in conjunction with the accompanying drawings and detailed specification.

BRIEF DESCRIPTION OF THE DRAWINGS

In order that the manner in which the above-recited and other advantages and objects of the present invention arc obtained, a more particular description of this invention, briefly described above, will be rendered by reference to a specific embodiment thereof which is illustrated in the appended drawings. Understanding that these drawings depict only a typical embodiment of the present invention and are not therefore to be considered in any way limiting of its scope, this invention will be described and explained with additional specificity and detail through the use of the accompanying drawings, in which.

DETAILED DESCRIPTION OF THE PREFERRED EMBODIMENT

The routing algorithm of the present invention operates on an $n_{d-1} \times n_{d-2} \times \ldots \times n_0$ no d-dimensional torus network, where $d \geq 1$ and $n_i \geq 2$ for all i, in $0 \leq i \leq d$. The torus network contains $$N = \prod_{i=0}^{d-1} n_i$$

nodes. Each node in the torus has a unique label of the form $(a_{d-1}, a_{d-2}, \ldots, a_0)$ and is connected to all of those nodes of the form $(a_{d-1}, \ldots, a_{i+1}, a_i \pm 1 \bmod n_i, a_{i-1}, \ldots, a_0)$, wherein $0 \leq i \leq d$. The parameter i will be referred to as the dimension of the edge. It should be appreciated that the class of $n_{d-1} \times n_{d-2} \times \ldots \times n_0$ d-dimensional torus networks contains the class of k-ary d-cubes as a subset.

Edges that connect nodes of the form $(a_{d-1}, \ldots, a_{i+1}, n_i-1, a_{i-1}, \ldots, a_0)$ and $(a_{d-1}, \ldots, a_{i+1}, 0, a_{i-1}, \ldots, a_0)$ are called wraparound edges, and all other edges are called internal edges. All of the edges are bi-directional. A transfer of a packet from a node of the form $(a_{d-1}, a_{d-2}, \ldots, a_0)$ to a node of the form $(a_{d-1}, \ldots, a_{i+1}, a_{i+1} \bmod n_i, a_{i-1}, \ldots, a_0)$ will be said to occur in the positive direction, and transfers in the opposite direction will be said to occur in the negative direction.

Each node in the torus interconnection network contains two input buffers associated with each edge incident to the node. For the sake of simplicity, we will assume that each buffer has sufficient storage for exactly one packet and that store-and-forward routing is used.

An adaptive routing algorithm specifies which movements between buffers are allowed. More specifically, given the source and destination nodes of a packet and given the buffers in which the packet is currently stored, an adaptive routing algorithm specifies a set of buffers to which the packet may be moved. We call this set of buffers to which the packet may be moved the packet's waiting set. All of the buffers in a waiting set must either be in the node which currently holds the packet or in neighboring nodes, i.e., nodes that are connected by an edge to the node currently holding the packet. A new packet with an arbitrary destination may be injected into the network at any time. The network routing algorithm moves a packet from one buffer to another only if the latter buffer is in the packet's waiting set. When a packet is moved from one buffer to another buffer, it occupies both of the buffers for a finite amount of time. After which, the former or previous buffer becomes an empty buffer.

Figure 1:
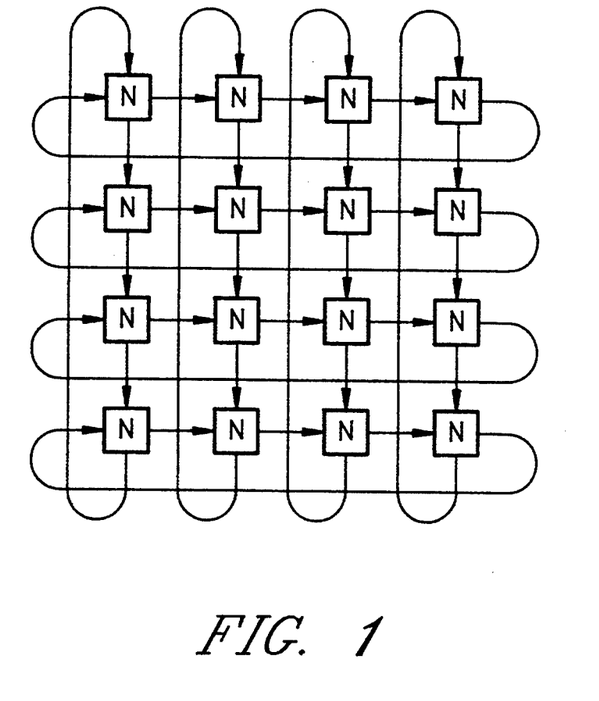
FIG. 1 illustrates a network diagram of a 4×4 torus network.

The torus network to which the preferred embodiment of the present invention is directed is shown in FIG. 1, which illustrates a network diagram of a 4×4 torus system. This torus network has for discussion purposes the following three fundamental properties: (1) a packet that is in a buffer of its destination node will be removed from the network within a finite amount of time; (2) no packet remains in a buffer forever if there is a buffer in its waiting set which is or becomes permanently empty; and (3) no packet remains in a buffer forever while an infinite number of other packets enter and leave some buffer in its waiting set. Properties 1 and 2 are finite-progress assumptions which provide that packets never wait infinitely long for no reason. These two properties prohibit a condition called starvation-in-wealth. Property 3 is a fairness assumption which prevents a buffer from being granted to a waiting packet while an infinite number of other packets are granted that particular buffer. This property prohibits a condition called starvation-in-poverty. An in depth discussion of the particulars of the above 3 properties can be found in Gunther, "Prevention of Deadlocks in Packet-Switched Data Transport Systems", IEEE Transactions on Communications, 3:178–186, 1989, which is hereby incorporated by reference for purposes of illustrating the state of the art.

The preferred embodiment of the message packet routing algorithm of the present invention has the initial step of defining a set of nodes to which the packet is allowed to move. Given a packet which is located at some node x, the set of nodes to which the packet is allowed to move consists of each node y such that y is adjacent to x in the torus and there exists a minimal length path from x to the packet's destination node which contains the edge from x to y.

The next step is to define a candidate set of buffers within the previously defined set of nodes. This candidate set of buffers consists of those buffers in the defined set of nodes which are associated with an edge which is incident to the node at which the packet is located. Thus all buffers in the candidate set can be reached by the given packet from its current location.

Next, the nodes in the network are ordered in inside-increasing order from smallest to largest. Inside-increasing order is defined formally as follows. Given any integer i, $0 \leq i \leq d$, let:

$$g(i) = \prod_{j=0}^{i-j} n_j,$$

(thus, $g(0)=1$,) where d is the torus dimension and Nj is length of the jth dimension of the torus.

Given any vector in the network having the form $(a_{d-1}, a_{d-2}, \ldots, a_0)$, let:

$$Eval(a_{d-1}, a_{d-2}, \ldots, a_0) = \sum_{i=0}^{d-1} g(i)a_i.$$

Given any integer $n \geq 2$ and any integer $a_i$, where $0 \leq a_i \leq n_i$, let:

$$f_1(a_i, n_i) = \begin{cases} a_i, \text{ if } a_i < \left\lfloor \dfrac{n_i}{2} \right\rfloor \\ \left\lfloor \dfrac{3n_i}{2} \right\rfloor - a_i - 1, \text{ otherwise.} \end{cases}$$

Let Inside$(a_{d-1}, a_{d-2}, \ldots, a_0)$=Eval$(f_1(a_{d-1}, n_{d-1})$, $f_1(a_{d-2}, n_{d-2}), \ldots, f_1(a_0, n_0))$. The function Inside gives the ranks of the torus nodes in inside-increasing order. An example is shown in Table 1.

TABLE 1

The inside-increasing ordering of the nodes in an 8 × 9 torus.

| 0  | 1  | 2  | 3  | 8  | 7  | 6  | 5  | 4  |
|----|----|----|----|----|----|----|----|----|
| 9  | 10 | 11 | 12 | 17 | 16 | 15 | 14 | 13 |
| 18 | 19 | 20 | 21 | 26 | 25 | 24 | 23 | 22 |
| 27 | 28 | 29 | 30 | 35 | 34 | 33 | 32 | 31 |
| 63 | 64 | 65 | 66 | 71 | 70 | 69 | 68 | 67 |
| 54 | 55 | 56 | 57 | 62 | 61 | 60 | 59 | 58 |
| 45 | 46 | 47 | 48 | 53 | 52 | 51 | 50 | 49 |
| 36 | 37 | 38 | 39 | 44 | 43 | 42 | 41 | 40 |

A transfer of a packet from a node A to an adjacent node B will said to occur to the inside if and only if node A is smaller than node B when they are numbered in inside-increasing order, and to the outside otherwise. Note that negative direction transfers along wraparound edges of the torus network occur to the inside while positive direction transfers along wraparound edges occur to the outside.

Figure 2:
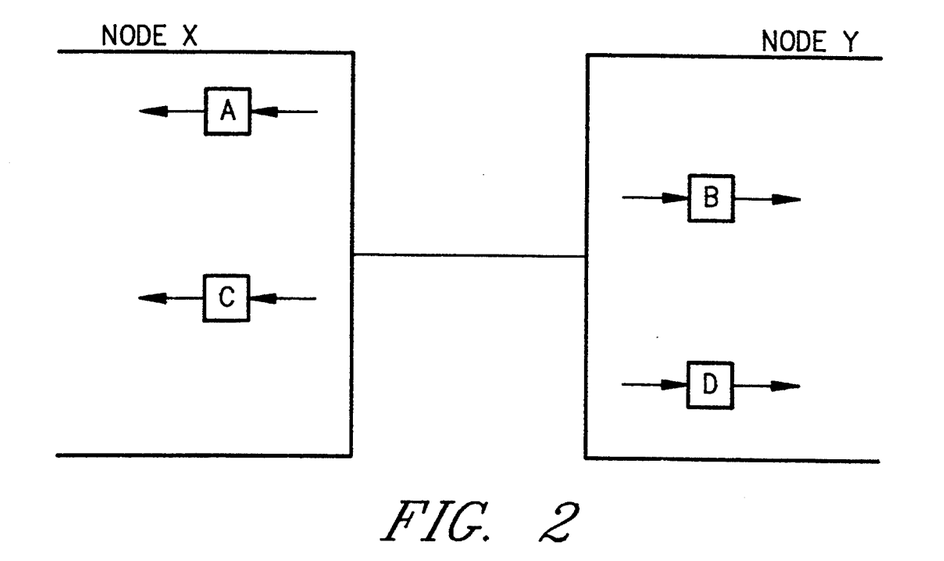
FIG. 2 is an illustration of the classification of the buffers associated with an edge connecting nodes x and y, where node x is smaller than node y when they are numbered in inside-increasing order.

Then, in each node, the buffers are classified into four classes, wherein the first class is designated as A, the second class is designated as B, the third class is designated as C, and the fourth class is designated as D for referential purposes. The classifying of the buffers comprises the dual steps of first, associating buffers of classes A and C with each edge which connects to a node that is larger in the defined ordering than the node containing the A and C classes of buffers and, second, associating buffers of classes B and D with each edge which connects to a node that is smaller in the defined ordering than the node containing the B and D classes of buffers. An example shown in FIG. 2, illustrates the classification of the buffers associated with an edge connecting nodes x and y, where node x is smaller than node y when they are numbered in inside-increasing order. It should be appreciated that the present method only requires a small number of buffers per node without central buffers in any of the nodes. The input buffers are divided into four classes, designated A, B, C, and D classes. The A and. C classes of buffers are associated with edges along which packets have moved to the outside, while the B and D classes of buffers are associated with edges along which packets have moved to the inside given the ordering defined above.

After the buffers in each node have been classified, the present method involves the following rules to establish the waiting set. First, placing into the waiting set the A and B classes of buffers contained in the candidate set of buffers provided that the packet is currently in a class A or B buffet and at least one of the nodes in the defined set of nodes is larger in the defined ordering than the node currently containing the buffer in which the packet resides. Second, placing into the waiting set the A and B classes of buffers contained in the candidate set of buffers provided that the packet is currently being injected into the toroidal network and at least one of the nodes in the defined set of nodes is larger than the node at which the packet is being injected into the network. Third, placing into the waiting set the C class of buffers contained in the candidate set of buffers provided that the packet is currently in a class A and B buffer and all of the nodes in the defined set of nodes are smaller in the defined ordering than the node currently containing the buffer in which the packet resides. Fourth, placing in the waiting set the C classes of buffers contained in the candidate set of buffers provided that the packet is currently being injected into the toroidal network and all of the nodes in the defined set of nodes are smaller in the defined ordering than the node at which the packet is being injected into the network. Fifth, placing into the waiting set the B and C classes of buffers contained in the candidate set of buffers provided that the packet is currently in a class C buffer and at least one of the nodes in the defined set of nodes is smaller in the defined ordering than the node currently containing the buffer in which the packet resides. Sixth, placing into the waiting set the class D buffers contained in the candidate set of buffers provided that the packet is currently in a class C buffer and all of the nodes in the defined set of nodes are larger in the defined ordering than the node currently containing the buffer in which the packet reside. Lastly, placing into the waiting set the class D buffers contained in the candidate set of buffers provided that the packet is currently in a class D buffer.

It should be understood that, given the above rules, all of the buffers that were placed in the waiting set are located in neighboring nodes which lie along minimal length paths from the packet's current node to its destination node. Therefore, it should be appreciated that the present packet routing algorithm uses only minimal length paths to route every message packet to its destination node.

For example, consider a packet which is routed from node (4,6,6) to node (3,1,1) in an 8×8×8 torus network. Assume that this packet takes the route (4,6,6)→(4,7,6)→(4,0,6)→(4,0,7)→(4,1,7)→(3,1,7)→(3,-1,0)→(3,1,1). This packet will first be injected into the network at node (4,6,6). When this packet is being injected, the step of defining a set of nodes to which the packet is allowed to move creates the set {(3,6,6), (4,7,6), (4,6,7)}, because all three of these nodes lie on minimal length paths between the source node (4,6,6) and the destination node (3,1,1). The step of defining a candidate set of buffers creates the set of buffers in the defined set of nodes which are associated with an edge which is incident to node (4,6,6). Next, the step of defining an ordering of the nodes from smallest to largest orders the nodes in the torus in inside-increasing order. In inside-increasing order, all of the nodes in the set {(3,6,6), (4,7,6), (4,6,7)} are smaller than node (4,6,6). The step of classifying the buffers into classes A, B, C and D classifies the buffers in the candidate set as being in classes A and C because they are associated with edges which connect to a node (namely (4,6,6)) which is larger in inside-increasing order than the node containing the A and C classes of buffers. The step of placing buffers into the waiting set places the class C buffers in the candidate set into the waiting set, because the packet is currently being injected into the network and because all of the nodes in the defined set of nodes {(3,6,6), (4,7,6), (4,6,7)} are smaller in inside-increasing order than node (4,6,6) which is the node at which the packet is being injected into the network. Because the selected route transfers the packet from node (4,6,6) to node (4,7,6) and because the packet's waiting set includes only a class C buffer in node (4,7,6), the packet is transferred to that class C buffer in node (4,7,6).

The above set of rules is repeated at each node so the packet will be stored in class C buffers in nodes (4,0,6) and (4,0,7). It will then be stored in a class B buffer in node (4,1,7) and in class C buffers in nodes (3,1,7) and (3,1,0). Finally, it will be stored in a class D buffer in node (3,1,1), from which it will be delivered.

The routing algorithm of the present invention is advantageous in that it is easy to implement. The preferred implementation is on a system of nodes with flags in each node which specify for each dimension i, $0 \leq i < d$, whether the node's value in dimension i is equal to 0, in the range 1 through $$\left\lfloor \frac{n_i}{2} \right\rfloor - 1,$$

equal to $$\left\lfloor \frac{n_i}{2} \right\rfloor,$$

in the range $$\left\lfloor \frac{n_i}{2} \right\rfloor + 1$$

through $n_i - 2$, or equal to $n_i - 1$.

When a packet is initially created, it is given a header which lists the direction and distance required in each dimension. When a packet is moved from one node to another, the corresponding distance field in the header is decremented. Given the packet header and the flags defined above, all of the tests that are required by the routing algorithm can be calculated locally. Since every edge requires exactly two input buffers, the same design can be used for all of the edges in each node and the same node design can be used repetitively throughout the torus network. As such, the present algorithm can be implemented on nodes having a small number of buffers per node and yet does not require central buffers in any of the nodes.

Figure 3:
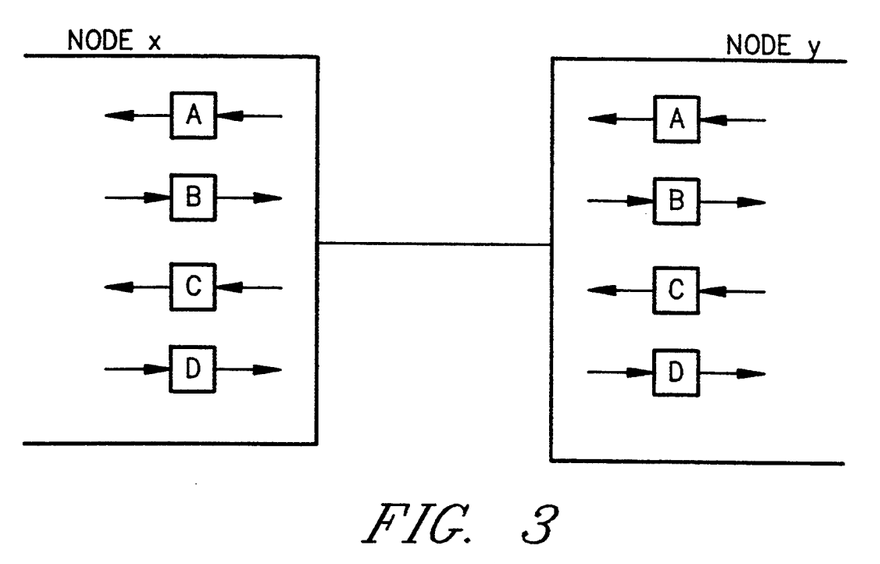
FIG. 3 is an illustration of 2 input and 2 output buffers associated with an edge connecting nodes x and y, where node x is smaller than node y when they are numbered in inside-increasing order.

An alternative implementation in which the present routing algorithm can be used is in a torus network wherein each of the above defined buffers is replaced by a pair of buffers, one of which is an input buffer and the other is an output buffer. The use of both input and output buffers is discussed in Berman, Gravano, Pifarre, and Sanz, "Adaptive Deadlock- and Livelock-Free Routing With All Minimal Paths in Torus Networks", Proceedings of the 4th Annual ACM Symposium on Parallel Algorithms and Architectures, pp. 3-12, 1992, which is incorporated by reference for purposes of illustrating the state of the art. An example is shown in FIG. 3, which illustrates 2 input and 2 output buffers associated with an edge connecting nodes x and y, where node x is smaller than node y when they are numbered in inside-increasing order. When a message is placed in an A output buffer, it is only allowed to move to the corresponding A input buffer, and similarly for buffers of classes B, C, and D. This has the advantage of requiring that each buffer examine the state of at most one buffer in a different node. This implementation separates the functions of routing messages within a node and routing messages between nodes thus increasing the potential for parallelism and the efficient use of available resources.

Another implementation is wherein larger buffers are used to hold more than a single packet each. Larger buffers are discussed in Konstantinidou, "Adaptive, Minimal Routing in Hypercubes", Proc. 6th MIT Conference on Advanced Research in VLSI, pp. 139-153, 1990, which is incorporated by reference for purposes of illustrating the state of the art. Although increasing the size of the buffers could improve the performance, note that all of the buffers would still have restrictions on the types of messages which they can hold. Because the utilization of large storage buffers may not be the best possible, this implementation should be limited to systems wherein storage space is not at a premium.

Another implementation wherein the routing algorithm of the present invention could find uses would be in the network wherein the nodes would have a pool of common central buffers which could be used by any messages in addition to the input buffers required by the algorithm. A network using common buffer pool techniques is discussed in Merlin and Schweitzer, "Deadlock Avoidance in Store-And-Forward Networks", IEEE Transactions on Computers, 28(3):345-354, March 1980, which is incorporated by reference for purposes of illustrating the state of the art. Note that the use of common buffers allows for more efficient use of the storage in the nodes than does the use of larger buffers because some of the storage is available to all of the packets attempting to enter the node. Because both common buffers and larger buffers require more storage than is required by any basic routing algorithm, it might appear that the goal of reducing the storage required for preventing deadlock is not relevant when these techniques can be used. However, reducing the amount of storage that is reserved for deadlock prevention could improve the utilization of the storage and thus the performance of the packet routing algorithm even in the case when additional storage space is readily available.

It is advantageous that the routing algorithm of the present invention can operate in either store-and-forward or virtual cut-through switching modes. The implementation of virtual cut-through routing should exhibit the same buffer acquisition and release properties as were assumed for the store-and-forward routing model upon which the present invention is discussed. In particular, the virtual cut-through implementation should not allow packets to progress to a new buffer unless it is guaranteed that sufficient storage for the packet will eventually be available at that buffer. One way to achieve this is to grant ownership of a buffer to at most one packet at a time and allow a packet to enter a new buffer only when it has been granted ownership. As long as a packet which receives ownership of a new buffer releases ownership of its old buffer within a finite amount of time, the implementation will have the same deadlock properties as the store-and-forward implementation.

The packet routing algorithm of the present invention is fully adaptive. To see this, let p be any packet that is being routed, let $(a_{d-1}, a_{d-2}, \ldots, a_0)$ denote the node in which p is currently stored, and let i be any dimension. It should be appreciated that p makes a total of at most $$\left\lfloor \frac{n_i}{2} \right\rfloor$$

moves along dimension i and that, whenever p is stored in a class D buffer, it has either completely corrected dimension i, in which case it requires no further moves along dimension i, or it has moved and will continue to move in the positive direction along dimension i, or it has moved and will continue to move in the negative direction along dimension i. Further, it should be appreciated that in order for p to be stored in a class D buffer it must first have been stored in at least one class C buffer.

Consider the case in which p will continue to move in the positive direction along dimension i. In this case, p must have already visited a node with value greater than or equal to $$\left\lfloor \frac{n_i}{2} \right\rfloor$$

in dimension i because otherwise it could not have entered a class C buffer. Furthermore, p must have then moved along a wraparound edge in dimension i because otherwise it could not have entered a class D buffer. The fact that p makes at most $$\left\lfloor \frac{n_i}{2} \right\rfloor$$

moves along dimension i implies that $$a_i < \left\lfloor \frac{n_i}{2} \right\rfloor.$$

Therefore, in this case p's next move along dimension i will occur to the inside.

Now, consider the case in which p will continue to move in the negative direction along dimension i. In this case, p must have already visited a node with value less than or equal to $$\left\lfloor \frac{n_i}{2} \right\rfloor$$

in dimension i because otherwise it could not have entered a class C buffer. Furthermore, p must have then moved to a node with the value 0 in dimension i because otherwise it could not have entered a class D buffer. Therefore, either p is currently in a node with the value 0 in dimension i or it has moved in the negative direction along a wraparound edge in dimension i. If p is currently in a node with the value 0 in dimension i, its next move along dimension i will be in the negative direction along a wraparound edge, which is a move to the inside. If p has already moved in the negative direction along a wraparound edge, the fact that it makes at most $$\left\lfloor \frac{n_i}{2} \right\rfloor$$

moves along dimension i implies that $$\left\lfloor \frac{n_i}{2} \right\rfloor < a_i.$$

Therefore, p's next move will have to occur to the inside. In either case, if p is currently stored in a class D buffer, then for each dimension i, $0 \leq i < d$, either p requires no further moves along the dimension i or p's next move along dimension i will occur to the inside. As such, the following proves that the present routing algorithm is fully adaptive.

In order for the routing algorithm of the present invention to be fully adaptive, all that is required is that the rules for creating waiting sets repetitively place into the packet's waiting set at least one buffer from each neighboring node which lies along a minimal length path from the packer's current node to its destination node.

Recall that the rules for creating waiting sets define a set of nodes to which the packet is allowed to move and that this set contains all of the neighboring nodes which lie along minimal length paths from the packet's current node to its destination node. In addition, the rules for creating waiting sets further define a candidate set of buffers within the defined set of nodes which is those buffers in the defined set of nodes which are associated with an edge which is incident to the node at which the packet is located. The steps of creating waiting sets particularly specify either one or two classes of buffers and place into that waiting set all of the buffers in the candidate set that are in the specified class or classes. Therefore, all that has to be shown is that every node in the defined set of nodes contains a buffer in the candidate set that is of the specified class or classes.

If the packet is currently stored in a class A or B buffer and all of the nodes in the defined set of nodes are smaller in the defined ordering than the node currently containing the buffer in which the packet resides, the present method specifies that class C buffers should be placed in the waiting set. Because every node in the defined set of nodes is smaller in the defined ordering, it must contain a class C buffer that is in the candidate set. If the packet is currently being injected into the toroidal network and all of the nodes in the defined set of nodes are smaller in the defined ordering than the node at which the packet is being injected, the present method specifies that class C buffer should be placed in the waiting set. Because every node in the defined set of nodes is smaller in the defined ordering, it must contain a class C buffer that is in the candidate set. If the packet is currently stored in class C buffer and all of the nodes in the defined set of nodes are larger in the defined ordering than the node currently containing the buffer in which the packet resides, the present method specifies that class D buffers should be placed in the waiting set. Because every node in the defined set of nodes is larger in the defined ordering, it must contain a class D buffer that is in the candidate set. If the packet is currently stored in class D buffer, the present method specifies that class D buffers should be placed in the waiting set. Because it was shown above that a packet stored in a class D buffer will only move to the inside and thus to a higher ordered node, every node in the defined set of nodes must contain a class D buffer that is in the candidate set. In all other cases, the present method specifies a pair of classes such that every node in the defined set of nodes contains a buffer that is in the candidate set in one of the specified classes.

As a result, it should be appreciated that the routing algorithm of the present invention is fully adaptive since every packet is allowed to be routed along every minimal length path from its source node to its destination node. Furthermore, it should be understood that because only minimal length paths are used and because full adaptivity is provided, congestion in the torus network is advantageously reduced.

In addition, in order to show that the present method is free from deadlock, livelock, and starvation it is necessary to first define a total ordering of the buffers in the torus. We will require that in this total ordering, all of the A buffers have ranks less than those of the B buffers and all of the B buffers have ranks less than those of the C buffers, and all of the C buffers have ranks less than those of the D buffers. We will also require that the B buffers are ranked in inside-increasing order with respect to one another, that the C buffers are ranked in the opposite of inside-increasing order with respect to one another with nodes which are nearer the boundaries being assigned larger ranks, and that the D buffers are ranked in inside-increasing order with respect to one another. Therefore, if p is any packet that is stored in a buffer and is being routed by the above algorithm, then either p is stored in its destination node or p's waiting set contains at least one buffer with greater rank in the total ordering defined above than the buffer in which p is currently stored. It therefore follows that the algorithm is free of deadlock and starvation.

Because p always takes a minimal length path to its destination, it visits only a finite number of nodes. Whenever p visits a node, it is stored in at most one of the buffers in that node. Therefore, if p is any packet that is being routed by the algorithm of the present invention then p will be stored in at most a finite number of buffers before being placed in the delivery buffer of its destination node. It therefore follows that the algorithm is free of livelock.

In summary, the present invention specifies a waiting set which consists of those buffers to which the packet can be transferred. This waiting set is used for packet routing on parallel computers with torus interconnection networks of arbitrary size and dimension having a plurality of nodes, each of which contains at least 2 buffers per edge incident to the node. For each packet which is being routed or which is being injected into the communication network, the present method specifies a waiting set which consists of those buffers to which the packet can be transferred. The present method is fully adaptive in that it allows every packet to be routed along every minimal length path from its source node to its destination node. Furthermore, the present method can be implemented on nodes having a small number of buffers per node without requiring central buffers in any of the nodes, and it is free of deadlock, livelock, and starvation.

The invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the foregoing description. Therefore, all changes which come within the meaning and range of equivalency of the claims are to be considered embraced within their scope.

What is claimed and desired to be secured by United States Letters Patent is:

1. A method for creating a waiting set for a packet in a toroidal interconnection network having a plurality of nodes, each of which contains a plurality of buffers per edge incident to the node, the method comprising the steps of:
    (a) defining a set of nodes to which the packet is allowed to move;
    (b) defining a candidate set of buffers within the defined set of nodes;
    (c) classifying the buffers into a plurality of classes; and
    (d) placing into the waiting set those classes of candidate buffers to which the packet can move.

2. A method as defined in claim 1 wherein the set of nodes to which a packet is allowed to move comprises each node to y such that y is adjacent to x in the torus and there exists a minimal length path from x to the packer's destination node which contains the edge from x to y, wherein x is the node at which the packet is located.

3. A method as defined in claim 1 wherein the candidate set of buffers within the defined set of nodes comprises those buffers in the defined set of nodes which are associated with an edge which is incident to the node at which the packet is located.

4. A method as defined in claim 1 wherein the method further comprises the step of defining an ordering of the nodes from smallest to largest.

5. A method as defined in claim 4 wherein the step of classifying the buffers into a plurality of classes further comprises the step of designating a first, second, third, and fourth class.

6. A method as defined in claim 5 wherein the step of classifying the buffers further comprises the step of:
    (1) associating buffers of the first and third classes with each edge which connects to a node that is larger in the defined ordering than the node containing the first and third classes of buffers.

7. A method as defined in claim 5 wherein the step of classifying the buffers further comprises the step of:
    (1) associating buffers of the second and fourth classes with each edge which connects to a node that is smaller in the defined ordering than the node containing the second and fourth classes of buffers.

8. A method as defined in claim 5 wherein the step of classifying the buffers further comprises the step of:
    (1) associating buffers of the second and fourth classes with each edge which connects to a node that is smaller in the defined ordering than the node containing the second and fourth classes of buffers.

9. A method as defined in claim 4 wherein the defined ordering of the nodes from smallest to largest is inside-increasing.

10. A method as defined in claim 9 wherein the inside-increasing ordering of the nodes is defined as the value given to the node $(a_{d-1}, a_{d-2}, \ldots, a_0)$ by the function Inside, wherein $$Inside(a_{d-1}, a_{d-2}, \ldots, a_0) = Eval(f_I(a_{d-1}, n_{d-1}), f_I(a_{d-2}, n_{d-2}), \ldots, f_I(a_0, n_0)),$$

and wherein $$f_I(a_i, n_i) = \begin{cases} a_i, & \text{if } a_i < \lfloor \frac{n_i}{2} \rfloor \\ \lfloor \frac{3n_i}{2} \rfloor - a_i - 1, & \text{otherwise,} \end{cases}$$

and wherein $$Eval(a_{d-1}, a_{d-2}, \ldots, a_0) = \sum_{i=0}^{d-1} g(i)a_i,$$

and wherein $$g(i) = \prod_{j=0}^{i-1} n_j,$$

and wherein $n_j$ is the length of the jth dimension of the torus.

11. A method as defined in claim 5 wherein the step of placing into the waiting set those classes of buffers to which the packet can move comprises the additional step of placing into the waiting set the first and second classes of buffers contained in the candidate set of buffers provided that:
  (1) the packet is currently being injected into the toroidal network; and
  (2) at least one of the nodes in the defined set of nodes is larger than the node at which the packet is being injected into the network.

12. A method as defined in claim 5 wherein the step of placing into the waiting set those classes of buffers to which the packet can move comprises the additional step of placing into the waiting set the third class of buffers contained in the candidate set of buffers provided that:
  (1) the packet is currently in a first or second class buffer; and
  (2) all of the nodes in the defined set of nodes are smaller in the defined ordering than the node currently containing the buffer in which the packet resides.

13. A method as defined in claim 5 wherein the step of placing into the waiting set those classes of buffers to which the packet can move comprises the additional step of placing in the waiting set the third class of buffers contained in the candidate set of buffers provided that:
  (1) the packet is currently being injected into the toroidal network; and
  (2) all of the nodes in the defined set of nodes are smaller in the defined ordering than the node at which the packet is being injected into the network.

14. A method as defined in claim 5 wherein the step of placing into the waiting set those classes of buffers to which the packet; can move comprises the additional step of placing into the waiting set the second and third classes of buffers contained in the candidate set of buffers provided that:
  (1) the packet is currently in a third class buffer; and
  (2) at least one of the nodes in the defined set of nodes is smaller in the defined ordering than the node currently containing the buffet in which the packet resides.

15. A method as defined in claim 5 wherein the step of placing into the waiting set those classes of buffers to which the packet can move comprises the additional step of placing into the waiting set the fourth class of buffers contained in the candidate set of buffers provided that:
  (1) the packet is currently in a third class buffer; and
  (2) all of the nodes in the defined set of nodes are larger in the defined ordering than the node currently containing the buffer in which the packet resides.

16. A method as defined in claim 5 wherein the step of placing into the waiting set those classes of buffers to which the packet can move comprises the additional step of placing into the waiting set the fourth class of buffers contained in the candidate set of buffers provided that the packet is currently in a fourth class buffer.

17. A method for creating a waiting set for a packet in a toroidal interconnection network having a plurality of nodes, each of which contains a plurality of buffers per edge incident to the node, the method comprising the steps of:
  (a) defining a set of nodes to which the packet is allowed to move;
  (b) defining a candidate set of buffers within the defined set of nodes;
  (c) defining an ordering of the nodes from smallest to largest;
  (d) classifying the buffers into first, second, third, and fourth classes comprising the steps of:
    (1) associating buffers of the first and third classes with each edge which connects to a node that is larger in the defined ordering than the node containing the first and third classes of buffers; and
    (2) associating buffers of the second and fourth classes with each edge which connects to a node that is smaller in the defined ordering than the node containing the second and fourth classes of buffers,
  (e) placing into the waiting set the first and second classes of buffers contained in the candidate set of buffers provided that:
    (1) the packet is currently in a first or second class buffer; and
    (2) at least one of the nodes in the defined set of nodes is larger in the defined ordering than the node currently containing the buffer in which the packet resides;
  (f) placing into the waiting set the first and second classes of buffers contained in the candidate set of buffers provided that:
    (1) the packet is currently being injected into the toroidal network; and
    (2) at least one of the nodes in the defined set of nodes is larger than the node at which the packet is being injected into the network;
  (g) placing into the waiting set the third class of buffers contained in the candidate set of buffers provided that:
    (1) the packet is currently in a first or second class buffer; and
    (2) all of the nodes in the defined set of nodes are smaller in the defined ordering than the node currently containing the buffer in which the packet resides;
  (h) placing in the waiting set the third class of buffers contained in the candidate set of buffers provided that:
    (1) the packet is currently being injected into the toroidal network; and
    (2) all of the nodes in the defined set of nodes are smaller in the defined ordering than the node at which the packet is being injected into the network;

(i) placing into the waiting set the second and third classes of buffers contained in the candidate set of buffers provided that:
  (1) the packet is currently in a third class buffer; and
  (2) at least one of the nodes in the defined set of nodes is smaller in the defined ordering than the node currently containing the buffer in which the packet resides;
(j) placing into the waiting set the fourth class of buffers contained in the candidate set of buffers provided that:
  (1) the packet is currently in a third class buffer; and
  (2) all of the nodes in the defined set of nodes are larger in the defined ordering than the node currently containing the buffer in which the packet resides; and
(k) placing into the waiting set the fourth class of buffers contained in the candidate set of buffers provided that:
  (1) the packet is currently in a fourth class buffer.

18. A method as defined in claim 17 wherein the set of nodes to which a packet is allowed to move comprises each node y such that y is adjacent to x in the torus and there exists a minimal length path From x to the packer's destination node which contains the edge from x to y, wherein x is the node at which the packet is located.

19. A method as defined in claim 17 wherein the candidate set of buffers within the defined set of nodes comprises those buffers in the defined set of nodes which are associated with an edge which is incident to the node at which the packet is located.

20. A method as defined in claim. 17 wherein the defined ordering of the nodes from smallest to largest is inside-increasing.

21. A method as defined in claim 20 wherein the inside-increasing ordering of the nodes is defined as the value given to the node $(a_{d-1}, a_{d-2}, \ldots, a_0)$ by the function Inside, wherein $$Inside(a_{d-1}, a_{d-2}, \ldots, a_0) = Eval(f_I(a_{d-1}, n_{d-1}), f_I(a_{d-2}, n_{d-2}), \ldots, f_I(a_0, n_0)),$$

and wherein $$f_I(a_i, n_i) = \begin{cases} a_i, \text{ if } a_i < \lfloor \frac{n_i}{2} \rfloor \\ \lfloor \frac{3n_i}{2} \rfloor - a_i - 1, \text{ otherwise,} \end{cases}$$

and wherein $$Eval(a_{d-1}, a_{d-2}, \ldots, a_0) = \sum_{i=0}^{d-1} g(i)a_i,$$

and wherein $$g(i) = \prod_{j=0}^{i-1} n_j,$$

and wherein $n_j$ is the length of the jth dimension of the torus.

22. A toroidal interconnection network for use in creating a wait set for a data packet, comprising a plurality of nodes interconnected in a selected configuration, wherein each node contains a processor and a plurality of buffers per edge incident to the node, processors being programmed to perform method steps comprising:
  defining set of nodes to which the packet is allowed to move;
  defining a candidate set of buffers within the defined set of nodes;
  classifying the buffers into a plurality of classes; and
  placing into the waiting set those classes of candidate buffers to which the packet can move.

23. A network as defined in claim 22, wherein the processors are further programmed to perform method steps of defining an ordering of the nodes from smallest to largest.

24. A network as defined in claim 23 wherein the processors are programmed such that the method step of classifying the buffers into a plurality of classes further comprises a step of designating a first, second, third, and fourth class.

25. A network as defined in claim 24 wherein the processors are programmed such that the method step of classifying the buffers further comprises a step of associating buffers of the first and third classes with each edge which connects to a node that is larger in the defined ordering than the node containing the first and third classes of buffers.

26. A network as defined in claim 24 wherein the processors are performed such that the method step of classifying the buffers further comprises a step of associating buffers of the second and fourth classes with each edge which connects to a node that is smaller in the defined ordering than the node containing the second and fourth classes of buffers.

27. A network as defined in claim 24 wherein the processors are programmed such that the method step of placing into the waiting set those classes of buffers to which the packet can move includes a step of placing into the waiting set the first and second classes of buffers contained in the candidate set of buffers provided that:
  (1) the packet is currently being injected into the toroidal network; and
  (2) at least one of the nodes in the defined set of nodes is larger than the node at which the packet is being injected into the network.

28. A network as defined in claim 24 wherein the processors are programmed such that the method step of placing into the waiting set those classes of buffers to which the packet can move includes a step of placing into the waiting set the third class of buffers contained in the candidate set of buffers provided that:
  (1) the packet is currently in a first and second class buffer; and
  (2) all of the nodes in the defined set of nodes are smaller in the defined ordering than the node currently containing the buffer in which the packet resides.

29. A network as defined in claim 24 wherein the processors are programmed such that the method step of placing into the waiting set those classes of buffers to which the packet can move includes a step of placing in the waiting set the third classes of buffers contained in the candidate set of buffers provided that:
  (1) the packet is currently being injected into the toroidal network; and (2) all of the nodes in the defined set of nodes are smaller in the defined ordering than the node at which the packet is being injected into the network.

30. A network as defined in claim 24 wherein the processors are programmed such that the method step of placing into the waiting set those classes of buffers to which the packet can move includes a step of placing into the waiting set the second and third classes of buffers contained in the candidate set of buffers provided that:
   (1) the packet is currently in a third class buffer; and
   (2) at least one of the nodes in the defined set of nodes is smaller in the defined ordering than the node currently containing the buffer in which the packet resides.

31. A network as defined in claim 24 wherein the processors are programmed such that the method step of placing into the waiting set those classes of buffers to which the packet can move includes a step of placing into the waiting set the fourth class of buffers contained in the candidate set of buffers provided that:
   (1) the packet is currently in a third class buffer; and
   (2) all of the nodes in the defined set of nodes are larger in the defined ordering than the node currently containing the buffer in which the packet resides.

32. A network as defined in claim 24 wherein the processors are programmed such that the method step of placing into the waiting set those classes of buffers to which the packet can move includes a step of placing into the waiting set the fourth class of buffers contained in the candidate set of buffers provided that the packet is currently in a fourth class buffer.

* * * * *

UNITED STATES PATENT AND TRADEMARK OFFICE
CERTIFICATE OF CORRECTION

PATENT NO. : 5,444,701
DATED : 08/22/95
INVENTOR(S) : Robert E. Cypher and Luis Gravano It is certified that error appears in the above-identified patent and that said Letters Patent is hereby corrected as shown below:

Column 14, line 10 (claim 2, line 3), delete "to"

Column 15, line 51 (claim 14, line 3), change "packet;" to --packet--.

Column 17, line 26 (claim 18, line 4), change "From" to --from--.

Column 17, line 34 (claim 20, line 1), change "claim." to --claim--.

Column 18, line 31 (claim 26, line 2), change "performed" to --programmed--.

Signed and Sealed this

Ninth Day of April, 1996

Attest:

BRUCE LEHMAN

Attesting Officer

Commissioner of Patents and Trademarks